INVENTORS
EARL J.W. RAGSDALE
CHARLES B. CONWELL
BY
ATTORNEY.

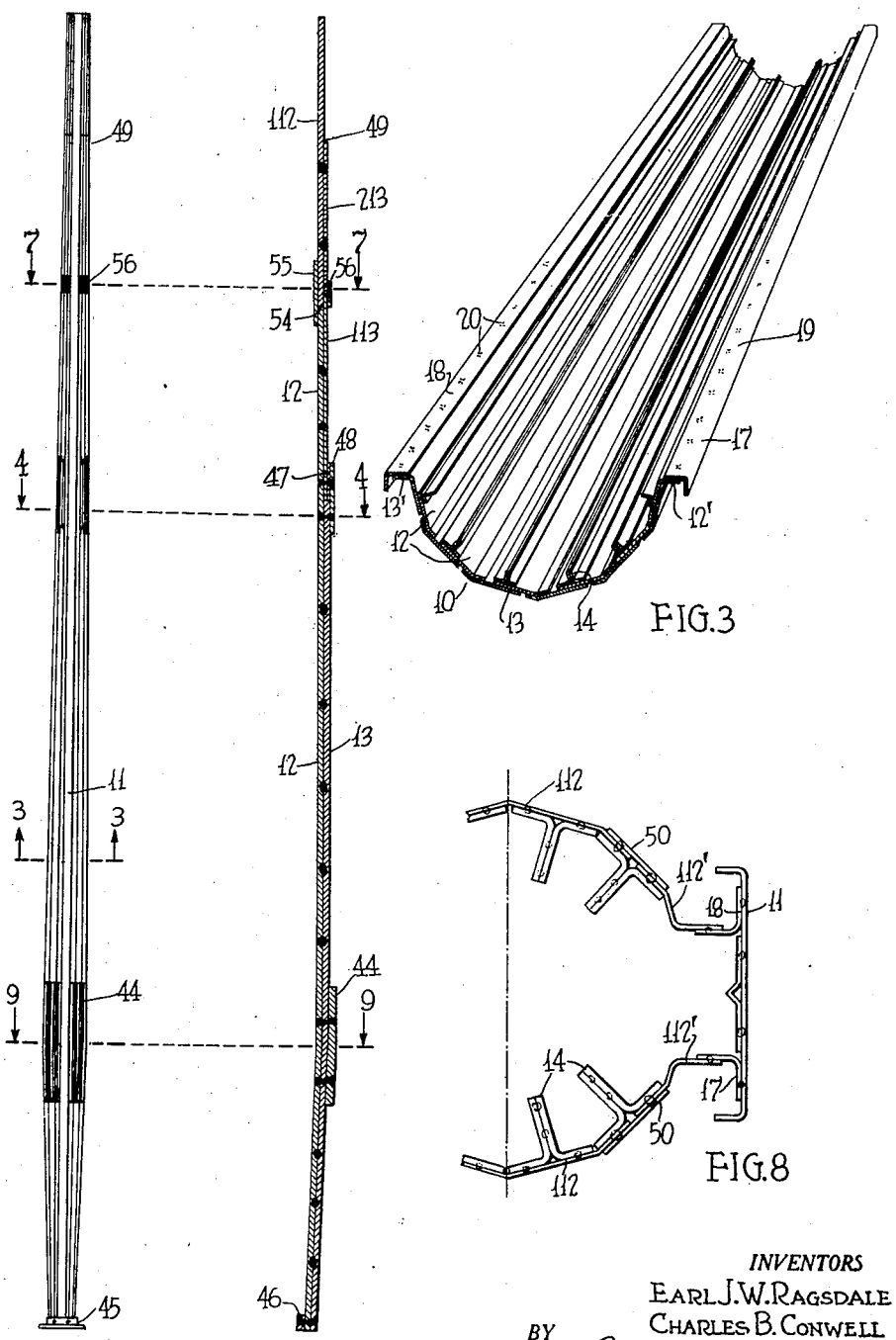

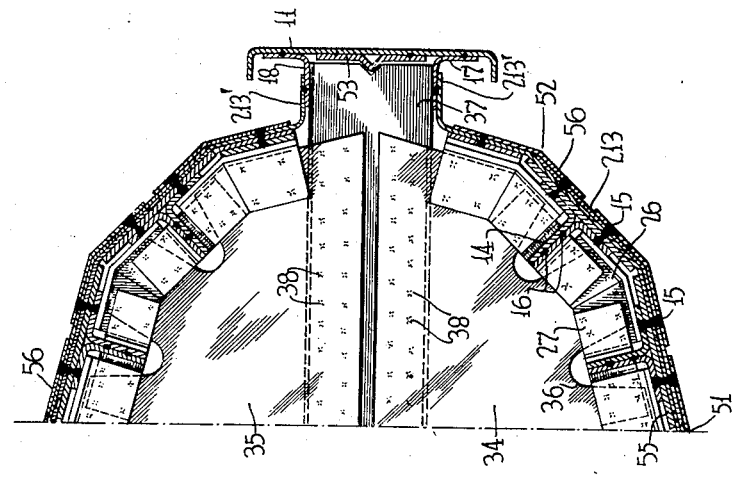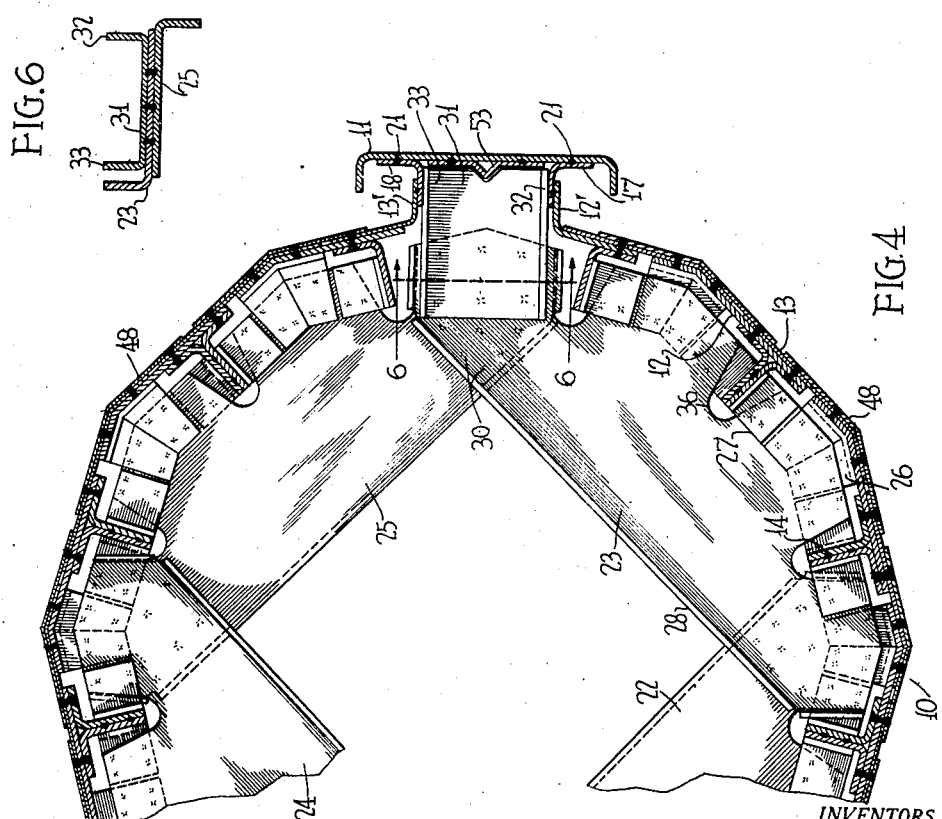

June 28, 1938.  E. J. W. RAGSDALE ET AL  2,122,380
MAST
Original Filed March 22, 1934   8 Sheets-Sheet 4
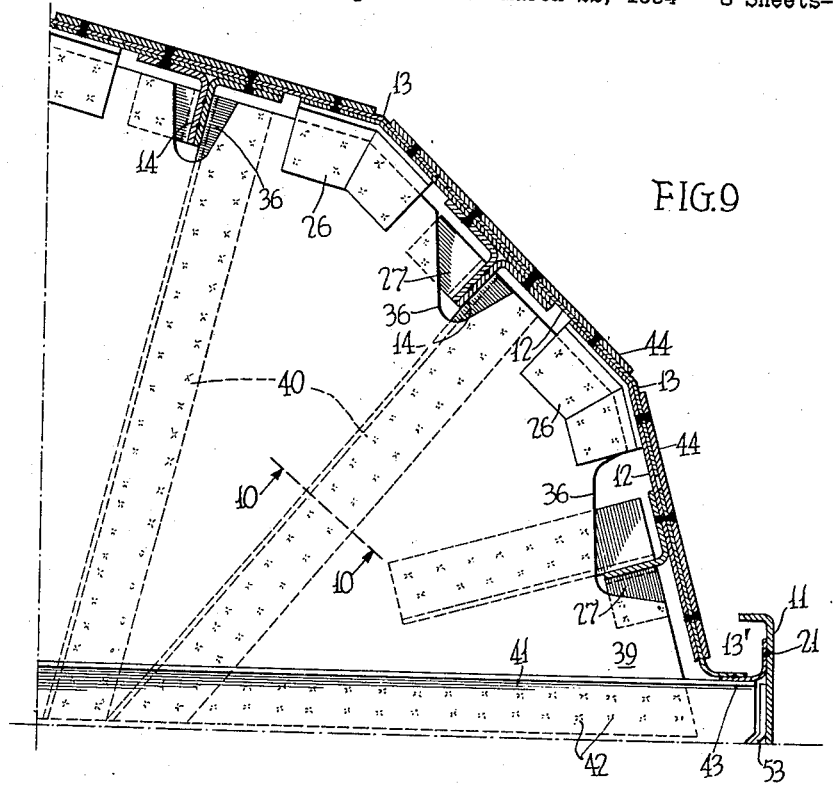
FIG.9
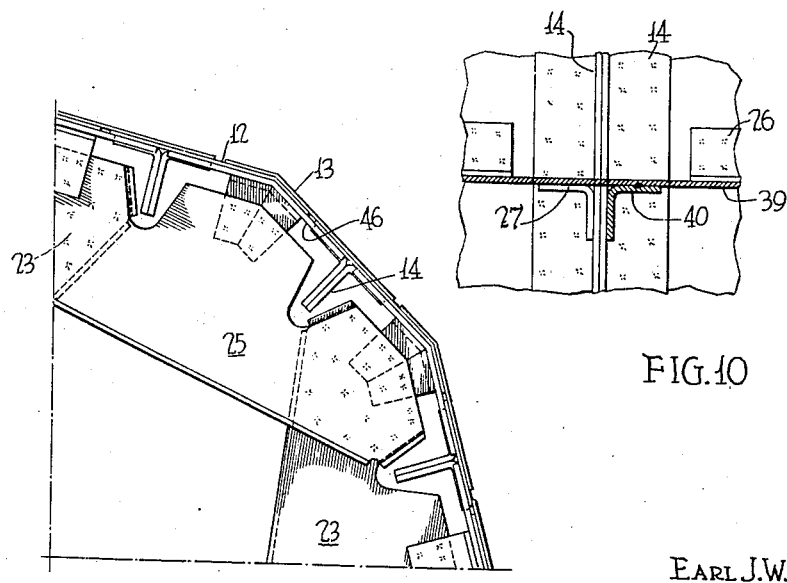
FIG.10
FIG.11
INVENTORS
EARL J.W. RAGSDALE
CHARLES B. CONWELL
BY
ATTORNEY.

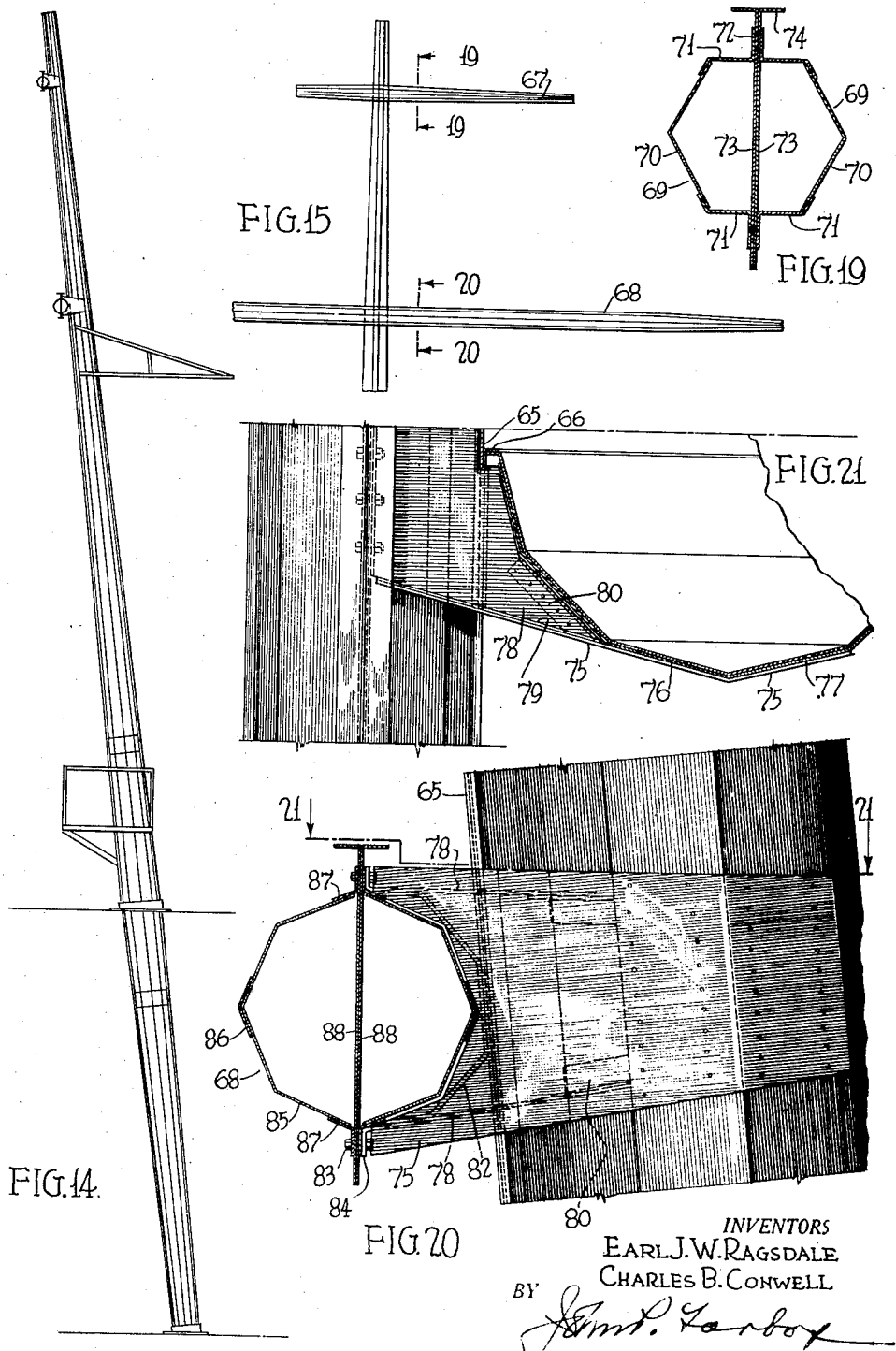

June 28, 1938.    E. J. W. RAGSDALE ET AL    2,122,380
MAST
Original Filed March 22, 1934    3 Sheets-Sheet 6

INVENTORS
EARL J.W. RAGSDALE
BY CHARLES B. CONWELL.
ATTORNEY.

June 28, 1938.  E. J. W. RAGSDALE ET AL  2,122,380
MAST
Original Filed March 22, 1934   3 Sheets-Sheet 7
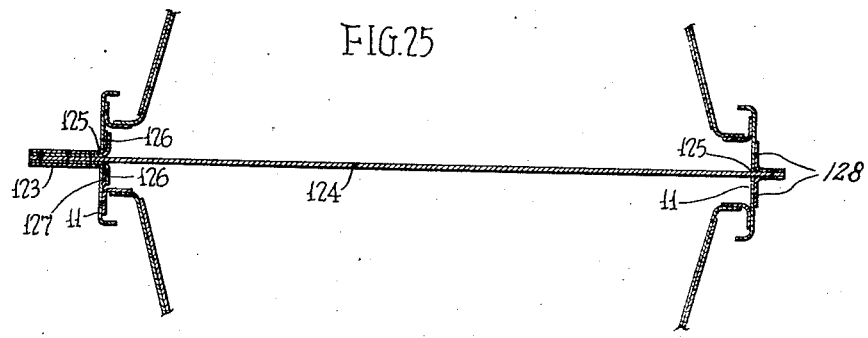
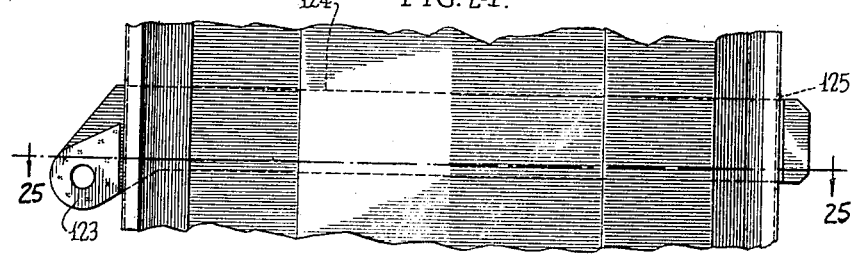
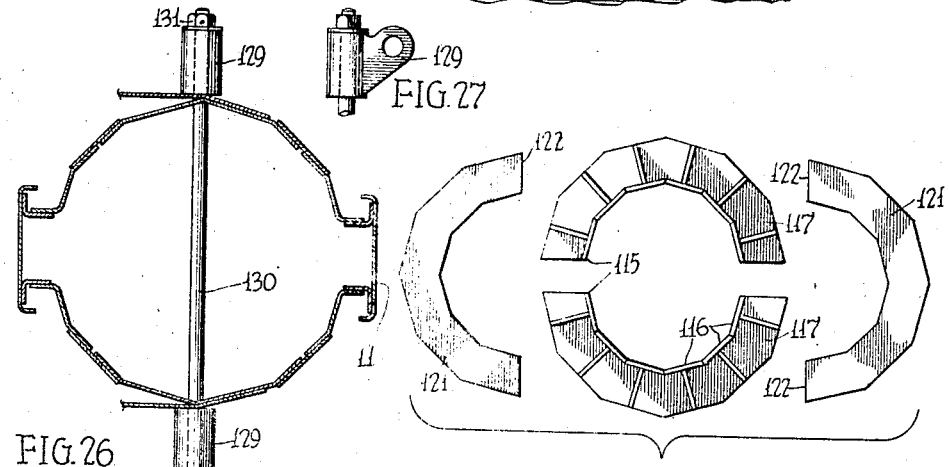
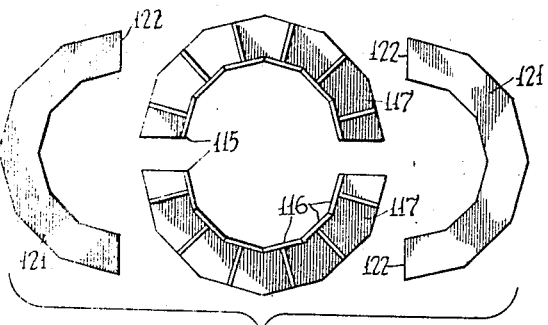
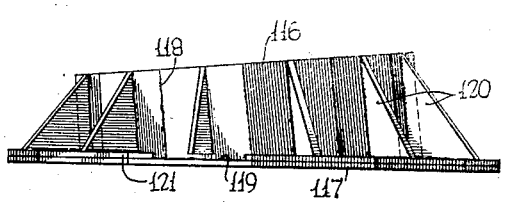
INVENTORS
EARL J. W. RAGSDALE
CHARLES B. CONWELL
BY
ATTORNEY.

June 28, 1938.    E. J. W. RAGSDALE ET AL    2,122,380
MAST
Original Filed March 22, 1934    8 Sheets-Sheet 8

INVENTORS
EARL J.W. RAGSDALE
BY  CHARLES B. CONWELL
ATTORNEY.

Patented June 28, 1938

2,122,380

UNITED STATES PATENT OFFICE 2,122,380

MAST

Earl J. W. Ragsdale, Norristown, and Charles B. Conwell, Narberth, Pa., assignors to Edward G. Budd Manufacturing Company, Philadelphia, Pa., a corporation of Pennsylvania Application March 22, 1934, Serial No. 716,836
Renewed November 19, 1937

18 Claims. (Cl. 189—23)

The present invention relates in general to sheet metal column structures and more specifically to hollow sheet metal, tapered column structures for use as ship's masts or the like.

One of the main objects of the invention is to provide a relatively light sheet metal column structure capable of being formed as a mast with any desired taper and to which various fittings for the support of rigging and various other equipment may be readily and securely attached during fabrication of the structure, the finished mast being capable of replacing a mast of the usual type of several times its weight.

Another and important object is to provide a structure of the above type capable of being fabricated from strips of sheet stainless steel by spot welding and with a high degree of accuracy in form and dimensions in the finished structure but with an easy tolerance as to form and dimension of the constituent elements.

Another object is the provision of a novel form of tapered stave and cooperative arrangement of such staves capable of being utilized in the construction of a mast of the above type, the tapered staves presenting substantially no additional difficulty in their formation over that of a straight sided stave.

Another object is the provision of a structure of the above type formed from structural elements capable of being used in identical form in several different parts of the structure and so shaped and related to each other as to be readily accessible for spot welding at those stages of the construction in which such spot welding is required.

Other objects look to the attainment of economy in the use of such relatively expensive high quality material as stainless steel in the construction of a mast, taking full advantage of its desirable qualities of high tensile strength and resistance to corrosion, and resulting in maximum strength with simplicity of structure.

Various other objects and advantages will become apparent as the description proceeds, it being understood that the construction disclosed is not limited to utilization in a mast or tapering column or beam, but may be used generally wherever a tubular column structure is desired.

The invention will be more readily understood upon reference to the following specification and the drawings accompanying same.

In the drawings:

Fig. 1 is an elevation of a tapered mast constructed according to the present invention, with attachments omitted.

Fig. 2 is a vertical section through one side wall of the mast, the thickness of the sheet metal elements being exaggerated for the sake of clearness.

Fig. 3 is a fragmentary perspective view, on an enlarged scale, in section on line 3—3 of Fig. 1 showing the shape and overlapping arrangement of the staves.

Fig. 4 is a fragmentary large scale sectional view taken on the line 4—4 of Fig. 1.

Fig. 6 is a section on the line 6—6 of Fig. 4.

Fig. 7 is a half section on the same scale as Fig. 4, but taken on the line 7—7 of Fig. 1.

Fig. 8 is a fragmentary top plan view of the top or small end of the mast.

Fig. 9 is a quarter sectional view taken on the line 9—9 of Fig. 1.

Fig. 10 is a fragmentary section taken on the line 10—10 of Fig. 9.

Fig. 11 is a bottom plan view of the bottom end of the mast, with the base member removed.

Fig. 14 is a side elevation of a simplified modification.

Fig. 15 is a fragmentary rear elevation of the upper portion of Fig. 14.

Fig. 19 is a section taken on the line 19—19 of Fig. 15 and enlarged thereover.

Fig. 20 is a fragmentary view partly in section on the line 20—20 of Fig. 15 on an enlarged scale.

Fig. 21 is a fragmentary view in section on the line 21—21 of Fig. 20.

Fig. 22 is an exploded view of a preferred form of base structure.

Fig. 23 is a starboard side view on an enlarged scale.

Fig. 24 is a fragmentary side elevation on an enlarged scale showing an attaching lug joint.

Fig. 25 is a section on line 25—25 of Fig. 24.

Fig. 26 is a transverse section through the mast showing a joint for attaching lugs on the starboard and port sides of the mast.

Fig. 27 is a side view of the swivel lug of Fig. 26.

Figure 12:
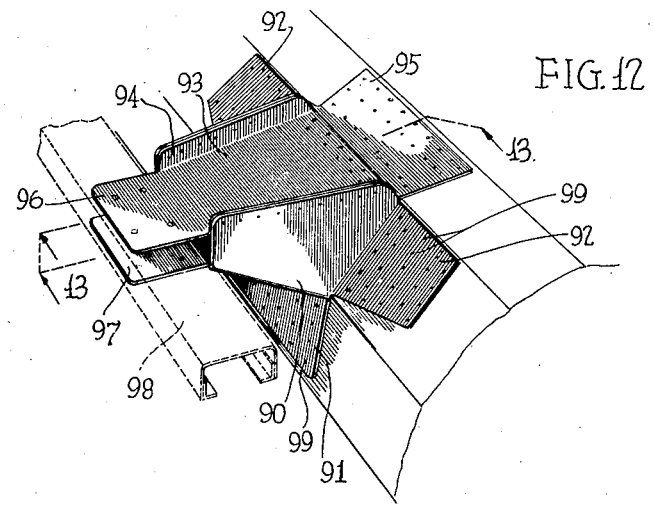
Fig. 12 is a perspective view of a ladder bracket.

Referring to the drawings in detail, and first to

Figs. 1 to 13, the walls of the mast are made in the general form of two trough-like halves 10, as shown in Fig. 3 secured together in spaced relation by a channel section cover plate 11 as indicated in Fig. 4. The wall structure of each half is built up of inner and outer layers of staves 12 and 13, respectively, tapered according to the desired taper of the mast, and of angular cross section as is clearly indicated in Fig. 3 and the various transverse sectional views. These angular staves are arranged with their adjoining edges spaced slightly apart with the angular corners of the staves of the inner layer overlapping the angular corners of the staves of the outer layer, and the joints between staves of one layer staggered with respect to those of the other layer. The staves are so shaped as to have a wide portion on one side of the angle and a relatively narrow portion on the other side, in which respect they are shaped as rights and lefts, for different adjacent layers, that is the staves of one layer are what might be termed mirrored images of those of the adjacent layer so that when laid with their corners overlapping, the narrow side of one stave will be overlapped by the broad side of the other, as is clearly shown in Fig. 3. In the present instance the angles of the staves are such as to form the corners of a duodecagon. In each half wall section the end stave 12' of the inner layer and the oppositely disposed end stave 13' of the outer layer vary in form from the other staves such that their narrow sides bend sharply outwardly to form outstanding outwardly projecting flanges for the half wall section.

The staves thus assembled to form a trough-like half portion of the mast, together with the longitudinal stiffening ribs 14 of angle-section overlapping the overlapped wide portions of the staves between the angular ridges of the staves, are all spot welded together through the several overlapping portions to form a unit structure. As is clearly shown in Figs. 3, 4 and 7, the stiffening ribs are secured by spot welds 15 through the overlapping portions of the inner and outer layers of staves. The stiffening ribs 14 are each formed from a pair of angle strips spot welded together by a line of spot welds 16 to form a unitary stiffening rib of T-shape section.

Connected to the end staves 12' and 13' are connecting flanges 17—18 in the form of angle strips spot welded to the end staves by rows of spot welds 19 and 20 respectively. The channel section cover plates 11 are welded to the connecting flanges 17—18 through lines of spot welds 21.

At spaced intervals along the mast, strengthening partitions or bulk-heads are provided varying in form according to their position in the mast but having the general form of two separate bulk-head members or sets of bulk-head members secured separately to opposite trough sections and arranged to overlap in the space between the trough sections so as to be accessible for attachment to each other through such space before the trough sections are secured together by the closing strip 11.

Figure 5:
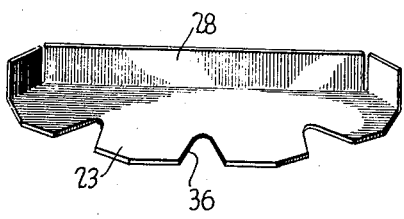
Fig. 5 is a perspective view on a small scale of a bulk-head member.
Figure 16:
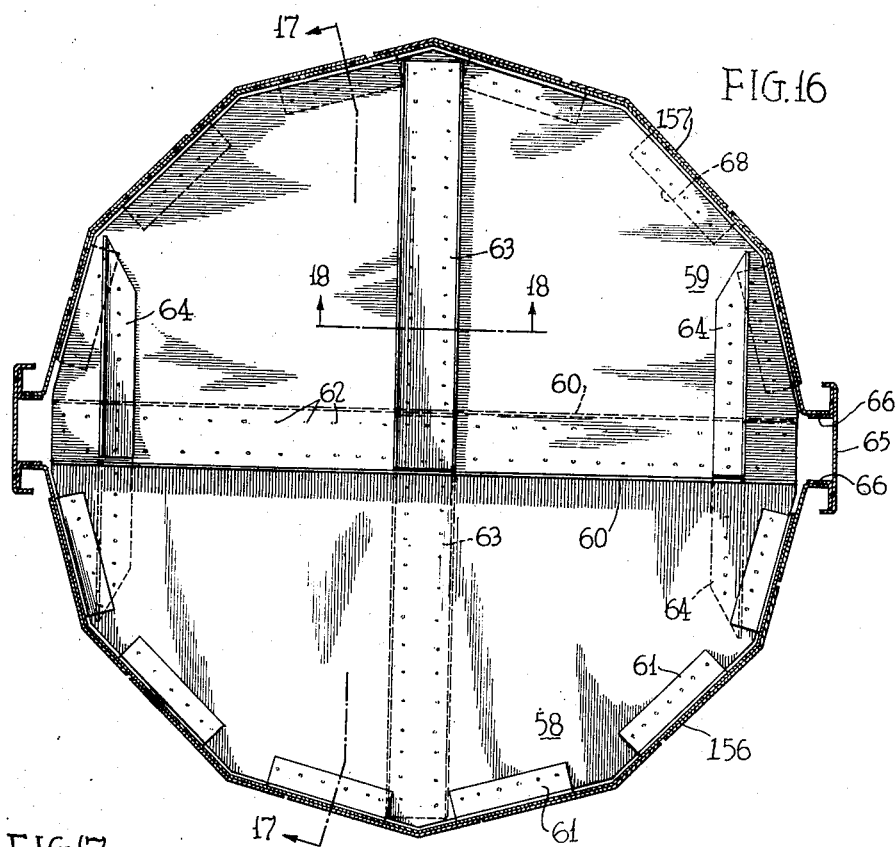
Fig. 16 is a transverse section on a large scale, taken on the line 16—16 of Fig. 17.
Figure 17:
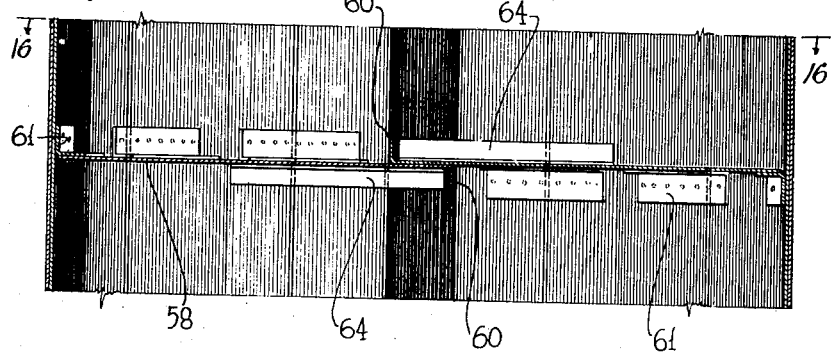
Fig. 17 is a section on the line 17—17 of Fig. 16.
Figure 18:
Fig. 18 is an enlarged detail section taken on the line 18—18 of Fig. 16.

As shown in Fig. 4, in that portion of the mast in the neighborhood of section line 4—4 of Fig. 1, the bulk-heads take the form of four transverse bulk-head members, 22 to 25, respectively, each shaped as shown in perspective in reduced size in Fig. 5. One pair of such bulk-head members, 22—23, is secured to the lower trough section 10 by means of angle clips 26 and 27 which connect the bulk-head members to the overlapping staves and to the radial flange of a stiffening rib 14, respectively, the clips being spot welded to the bulk-head sections and to the overlapping wall staves and stiffening ribs. The bulk-head members 22 and 23 are provided with stiffening flanges 28 as clearly shown in Fig. 5 and are arranged in overlapping contact at their lower ends, back-to-back with the flanges 28 extending away from each other, the overlapping portions being spot welded together by spot welds 30 as indicated in Fig. 4. Each of the bulk-head members is provided with notches 36 in its peripheral edge to clear the radial flanges of the stiffening ribs 14 and is shaped to follow the contour of the interior of the trough section in spaced relation thereto, the clearances thus provided permitting a wide margin of adjustment in fitting the parts together. Similarly the bulk-head sections 24 and 25 are secured in the upper trough section 10, and the parts are so proportioned and arranged in relation to each other that the ends of the bulk-head sections toward the sides of the trough will extend into overlapping relation with each other in the space between the troughs when the two trough sections are placed together as shown in Fig. 4. This enables the outer ends of opposite bulk-head members such as 23 and 25 to be spot welded together where they overlap in the space between the two trough sections by spot welds 30, they being readily accessible for welding through the space between the connecting flanges 17—18 before the cover plate 11 is welded in place. The securing together of such pairs of bulk-head members along each side of the mast forms in effect, a unit bulk-head connecting the two halves of the mast. To further join the trough members 10 to each other and to the bulk-heads, an intermediate joining member 31 of general trough section is provided, arranged with the base of the trough spot welded through the overlapping ends of sections 23 and 25, and with the side walls 32 and 33 spotwelded through the overlapping portions of the members 17—12' and 18—13', respectively.

In smaller sections of the mast such as those in the neighborhood of the section line 7—7 of Fig. 1, the bulk-heads take the simpler form as shown in Fig. 7, where it will be seen they are comprised of two bulk-head members 34 and 35 connected respectively to the lower and upper trough sections by angle clips 26 and 27 connecting the bulk-head members with the overlapping wall staves and with the radial flange of a stiffening rib 14, respectively.

The bulk-head members 34 and 35 are flat plates and are similar to the quarter bulk-head members 22 to 33 in their cooperative relation to other parts of the structure in that they too are provided with peripheral notches 36 to clear the stiffening ribs 14, and follow the contour of the interior of the trough sections in spaced relation thereto, the clearances between the bulk-head members and the stiffening ribs and inner staves being amply sufficient to permit a wide margin of adjustment of a bulk-head member in its place before welding without danger of setting up stresses between the parts. The bulk-head members 34 and 35 also extend into the space between the trough sections but instead of being secured together in a lap joint they are joined through a joining member 37 in the form of a channel section strip extending diametrically through the space between the trough sections with its back wall overlapping and spot welded to the bulk-head members by spot welds 38. The joining member 31 is also secured through its side walls to the flanges 17—18 and the out-turned sides of the end staves 213' of the trough sections by spot welds through the overlapping portions of these members. As the bulk-head members 34 and 35, and the joining member 37 engage with each other along the space between the trough sections, they are readily accessible through this space for spot welding.

In the neighborhood of the plane where the mast changes taper, section line 9—9 in Fig. 1, which is also the plane where the mast passes through and is secured to the main deck, there are two large bulk-heads spaced a relatively short distance apart one above and one below this plane, each comprising a pair of bulk-head members 39 (Fig. 9) of the same general shape as those of Fig. 7 and similarly cooperatively related to other parts of the structure except that they are larger because of the larger diameter of the mast at this level, and are reinforced by radial stiffening ribs 40 of angle section spot welded flat along the under side of the bulk-head plate with their outer ends spot welded through their vertical sides to the radial flanges of the longitudinal stiffening ribs 14. The bulk-head members 39 are also secured to the stiffening ribs 14 through angle clips 27 and to the inner staves by angle clips 26. A channel section joining member 41 joins two diametrically opposite bulk-head members 39 by being spot welded to each along the space between the trough sections by spot welds 42 and further secures the trough sections together by having its side walls spot welded to the spaced side edges of the troughs at points of overlap therewith as indicated at 43 in Fig. 9.

Also where the mast changes taper and passes through the main deck near the plane of the section line 9—9 of Figs. 1 and 2, it is reinforced by longitudinal battens 44 (Figs. 1, 2 and 9) of flat cross section lying flat against the faces of the polygonal mast, curved to conform to the reverse taper of the mast at this point and spot welded through both layers of staves and the longitudinal stiffening ribs 14. This affords a reinforced zone at which the mast may be secured to the main deck by any known or other suitable means such as lugs, or a collar. The bottom of the mast may be secured to a deck below the main deck in any known or other suitable manner as by the base collar 45 (Fig. 1) having an opening with side walls suitably arranged to receive the end of the mast preferably in flat contact with the faces of the polygonal mast and bolted or otherwise secured to the mast.

To facilitate bolting of the walls of the mast to the collar 45, the longitudinal stiffening ribs 14 are discontinued where the mast enters the collar and are substituted by short reinforcing battens 46 (Figs. 2 and 11) of relatively thick, angle section fitted flat against the inner walls of the mast and spot welded thereto.

Inasmuch as the mast tapers toward the top it is desirable to thin the walls as they approach the upper end by splicing in thinner staves in one or both layers, preferably the outer layer. This thinning of the walls is accomplished in the present instance by discontinuing the outer layer of staves 13 at a given level and splicing in an outer layer of thinner staves 113 as shown in Fig. 2 near the section line 4—4. At this spliced joint the mast is reinforced by longitudinal battens 48 of angular cross section fitted over the angular ridges of the outer layer of staves 13 and 113 across the splice with filler members 47 interposed between the battens and the thin staves and welded in place by spot welds through the several overlapping layers.

To further thin the walls of the mast near the topmost portion, one layer of staves is discontinued beyond a given point leaving a single layer beyond that point to the top. In the present instance the layer of thin outer staves 113 is discontinued at the point 49 (Figs. 1 and 2) and the inner layer of staves 112 continued on to the top as a single layer (Fig. 8) in which the joints between the angular staves 112 are covered by flat cover strips 50.

Continuous tapering of the mast to the top end without undue narrowing of the outer staves 113 is effected by discontinuing the staves 113 at a given level, for example just below the section line 7—7 of Fig. 2, and continuing from there on to the top 49 of the outer layer with a third tier of outer staves 213, less in number and greater in angular width than the staves 113. This will be clear upon reference to Figs. 7 and 28 where it will be seen that there are but four of the staves 213, two for each trough section, each stave extending from near one side of the bottom ridge 51 of a trough section to the adjacent extreme side ridge 52 of the trough section.

Figure 28:
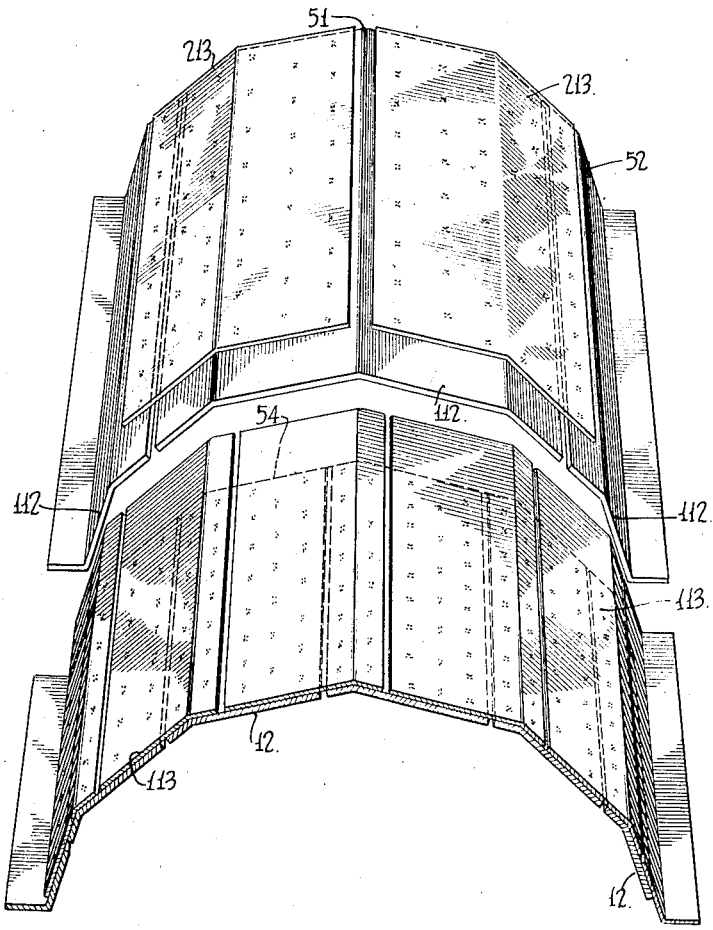
Fig. 28 is a fragmentary perspective view showing top and bottom portions of the joint near the section line 7—7 of Figs. 1 and 2.

To accommodate the inside layer of staves to the taper of the mast near the top portion without undue narrowing of the staves, the inner layer of staves 12 are discontinued at 54 (Fig. 2), from which point upwardly a second tier of inner staves 112 are continued, the staves 112 being less in number and greater in angular width than the staves 12, as will be clear from an inspection of Figs. 8 and 28, where it will be noted that there is but one stave 112 for each trough section extending around between the two flanged side staves 112' of that trough section, and that the angle subtended by the staves 112 is considerably greater than the angular width of the staves 12 (Figs. 3, 4 and 28).

The upper inside layer of staves 112 are spliced in as a continuation of the inside layer of staves 12 just below the section line 7—7 (Fig. 2), while the third tier of outer staves 213 are spliced in as a continuation of the outer layer slightly above the section line 7—7 of Fig. 2. This general arrangement in tiers heretofore described is a vertical succession of tiers each substantially annular in shape.

The two trough sections of the mast, constructed as above described, and secured together by joining the complementary sections of the bulkheads together, and by joining the bulk-heads thus joined to the two trough sections through the channel section joining members 31 and 37, as is clearly shown in Figs. 4 and 7, respectively, are further joined along their side flanges by the cover strips 11 of channel section welded on to the flange members 17 and 18 by a line of spot welds 21 running the length of the mast. The cover strips 11 are reinforced by an inner beaded strip 53 which together with the cover strip 11 forms a stiffening rib, one for each side of the mast.

Near the top of the mast in the neighborhood of the joint between the outer tiers 113 and 213, and the joint between the tiers of staves 12 and 112, inner and outer rows of battens 55 and 56, respectively (Figs. 1, 2 and 7), are spot welded across the adjacent tiers to reinforce said joints.

The top end of the mast may be closed off by a top plate, cap, or other suitable top structure according to the particular use to which the mast is to be put.

Referring now to the modified form of the device shown in Figs. 14 to 21 inclusive, this is a simplified form suitable for small masts, and like the preferred form it is also built up of two trough like sections 156 and 157 secured together to form a tapering column structure of duodecagonal form. The trough sections of this modified form are built up in substantially the same way as those in the preferred form previously described, except that there are no internal stiffening ribs corresponding to the ribs 14 of the form previously described.

The present form also differs from the preferred form in that the bulk-heads are each comprised of two overlapping halves 58—59 of generally semi-circular form provided with a flange 60 along the straight edge and having the periphery shaped to conform generally to the contour of the inside of the trough section, but spaced therefrom to allow a suitable clearance all around for adjustment of the bulk-head member in place before welding. The bulk-head members 58—59 are secured in their respective trough sections by suitable angle clips 61 spot welded to the bulk-head section and to the overlapping staves of the trough section. The flanged marginal edges of the bulk-head members 58 and 59 overlap in the space between the trough sections where they are spot welded together by spot welds 62 with their flanges 60 extending in opposite directions, as will be clear from inspection of Figs. 16 and 17.

To brace the bulk-head in a direction at right angles to the bracing afforded by the flanges 60, a channel section beam is welded at its bottom wall to each bulk-head on the flanged side of the bulk-head extending from the inside of the bulk-head flange 60 to near the peripheral edge of the bulk-head member. As the channel beams 63 extend over the overlapping marginal edges of the bulk-head members, some of the spot welds 62 also pass through all four overlapping members, that is, the edge portions of the bulk-heads and the central ends of the channel beams 63, which multiple overlapping gives a hub like central anchorage from which the radial reinforcing members 63 and flanges 60 radiate.

The bulk-head members 58 and 59 are further reinforced by angle beams 64 spot welded flat against one side of each of the bulk-head members and arranged thereon so that the inner ends of the members 64 of one bulk-head member will overlap those of the other bulk-head member in the space between the trough sections permitting all four overlapping members to be spot welded together in the joining together of the two trough members by the bulk-head members.

The two trough sections thus formed and secured together by the bulk-head members are further secured by side strips 65 through the longitudinal flanges 66 in a manner similar in all respects to that described in connection with the preferred form, Figs. 1 to 13.

Suitable yard arms such as the antenna yard arm 67, and signal yard arm 68 are constructed as shown in Fig. 19, in a manner broadly similar to that of the mast construction in that they are constructed in the form of two trough sections or halves 69 each composed of middle staves 70 and side staves 71 of angular section, the side staves being provided with flanges 72 for securing the troughs together through a median partition member 73 extending longitudinally along and diametrically across and through the finished yard arm, said median members being provided with top flanges 74 for carrying the various attachments for supporting antenna connections, signal devices, etc. The staves 70 and 71 are joined together by spot welding near the corner ridges of the staves 71, while the two half sections are spot welded together through the several overlapping layers where the flanges 72 overlap the interposed median partitions 73.

For securing the yard arms 67 and 68 to the mast a special bracket structure is provided which upon reference to Figs. 20 and 21 will be seen to comprise a pair of flat bracket arms 75, each spot welded to two of the adjacent side faces 76—77 of the mast and extended outwardly therefrom beyond the rear side, from which point on they are bifurcated by a semi-octagonal recess, shaped and proportioned to receive one side of the yard arm 68. The bracket arm 75 is braced by top and bottom gusset plates 78 spot welded on to the bracket arm 75 through flanged portions 79 and connected to an outer face of the mast by suitable angle clips, such as 80, spot welded to the gusset plates 78 and to the faces such as 81 of the mast. Further bracing of the bracket as a whole is effected by a trough shaped reinforcing member 82, having its sides spot welded to the gusset plates 78 and its bottom wall spot welded to the rear face or cover strip 65 of the mast. The yard arm 68 is bolted on to the bracket by means of bolts 83 clamping the flanged sides of the yard arm on to mounting flanges 84 formed at the ends of the gusset plates 78.

The construction of the signal arm 68 varies slightly from that of the antenna yard arm 67, in that each complete half or trough section is comprised of two angular staves 85, secured together at the bottom or central angle of the trough section by an overlapping outside angle stave 86. The two trough sections are secured together by longitudinal flanged strips 87 spot welded to the outer side edges of the staves 85, and to corresponding flanges on the other trough section through a pair of median partition plates 88 each extending diametrically across and longitudinally of the signal arm, the trough sections and median plates being all secured together by spot welds passing through the several overlapping layers of metal along the flanged sides of the yard arm.

Figure 13:
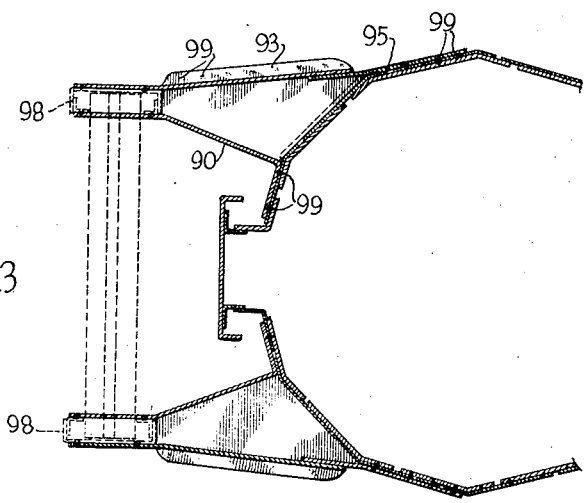
Fig. 13 is a section on the line 13—13 of Fig. 12.

For securing a ladder to the side of the mast, special brackets are provided as shown in Figs. 12 and 13, each consisting of a sheet metal arm 90 of channel section with converging side walls, having one end of its bottom wall bent downwardly to form a flange 91 and the adjacent ends of its side walls bent outwardly to form a pair of side flanges 92. The outer or narrower end of the bottom wall of the trough-section arm is extended outwardly to form a holding flange 97. The top of the arm 90 is closed by a cover member 93 secured to the side walls of the channel member by up-standing side flanges 94 spot welded to side walls of the arm 90. A flange 95 spot welded to the wide end of the cover member 93 extends beyond the base of the arm 90 to form an additional attaching flange, while the narrow end of the cover member is extended outwardly to form a holding flange 96, the holding flanges 96 and 97 being extended outwardly parallel to each other and spaced apart to receive the side rail 98 of a suitable ladder structure. The bracket as a whole is secured to the side faces of the mast through the flanges 91, 92 and 95 by spot welds 99, the mounting flanges being set at such angles as to lie flat against the different faces of the mast. As will be clear from an inspection of Fig. 3, each bracket is arranged to be secured solely to one of the trough sections of the mast, thus enabling the brackets to be readily spot welded in place before the trough sections are brought together.

A preferred form of base collar 45 is shown in Figs. 22 and 23. This is fabricated of flat pieces of heavy gauge stainless steel arc welded together. The collar portion 115 is constructed first in two halves from a plurality of upstanding panel members 116 arranged to form the two halves of a collar with sides shaped to lie substantially flat against the outer faces of the bottom end of the mast. The panel members 116 are arc welded together along their adjoining edges and to a base plate section 117 at 118 and 119 respectively. Buttress members 120 are arc welded to the outside faces of each of the panels 116 but spaced from the base plate sections 117 to admit the insertion of a pair of semi-circular intermediate locking plates 121. After the sections of the collar portion 115 with their respective base plate sections are arc welded together to form a complete collar, the intermediate plates 121 are slid into place between the bottoms of the buttress members 120 and the base plate, and welded together along their juxtaposed edges 122, after which the bottoms of the buttress members 120 are arc welded to the intermediate plate, and the intermediate plate welded to the base plate.

Where attaching lugs are to be joined to the sides of the mast for holding various rigging exerting a lateral stress on the mast, they are joined to the mast by stress transmitting members passing diametrically through the mast and secured to opposite walls thereof so as to distribute the load to both sides and thus prevent transverse elongation. Figs. 24 and 25 show the method of joining a lug to the fore or aft side of the mast. Here the lug 123 is built up of overlapping layers of sheet material on the end of a stress transmitting member 124 in the form of a strip of heavy gauge sheet metal. The stress transmitting member 124 extends diametrically through the mast passing through suitable slots 125 in the cover plate 11 and is secured to the latter at the lug carrying end through flanges 126 formed on the ends of two of the layers of material forming the lug 123, the flanges 126 being spot welded to the cover strip through short reinforcing strips 127. At the end opposite the lug, the strip 124 is secured to the cover strip through short angle strips 128 spot welded to the strip 124 and to the cover strip.

Swivel lugs 129 (Figs. 26 and 27) are attached by means of a shaft 130 passing diametrically through the mast and holding the swivel lugs by suitable locked nut and washer connections 131.

While we have thus shown certain specific embodiments of the invention for the sake of disclosure, it is to be understood that the invention is not limited to such specific embodiments, but contemplates all such variations thereof as fall fairly within the scope of the appended claims.

What we claim is:

1. A sheet metal column structure of polygonal cross-sectional contour formed of overlapping layers of tapered staves of angular section each stave having a relatively wide portion on one side of the angle and a relatively narrow portion on the other side of the angle, the narrow portions in one layer overlapping a portion of the wide portions of another layer, the marginal edges of the wide portions of both layers overlapping, and longitudinal stiffening ribs secured to the inside surfaces of the inside layer of staves each spot welded through the said overlapping marginal portions of the said wide portions, said ribs having freely projecting arms and a bulk-head structure secured to said arms.

2. A sheet metal column structure comprising a pair of trough sections facing inwardly of the column and spaced apart, and a pair of bulk-head members fixedly secured one to each trough within the trough and secured to each other in the space between the troughs.

3. A sheet metal column structure comprising a pair of trough sections facing inwardly of the column and spaced apart, and a pair of bulk-head members fixedly secured one to each trough within the trough extending into overlapping engagement with each other in the space between the troughs and secured together in said space.

4. A sheet metal column structure comprising a pair of trough sections facing inwardly of the column and spaced apart, and a pair of bulk-head members fixedly secured one to each trough within the trough extending into a position to be joined to each other at a point accessible through the space between the trough sections.

5. A sheet metal column structure comprising a pair of trough sections facing inwardly of the column and spaced apart, and a pair of flanged bulk-head plates secured in each trough section in overlapping engagement with each other, the bulk-head plates of one trough section extending into overlapping engagement with those of the other section in the space between the troughs.

6. A sheet metal column structure comprising flanged trough sections facing inwardly of the column and spaced apart, a pair of bracing members one secured within each of two adjacent trough sections and joined to each other in the space between the said two adjacent trough sections, and a longitudinal connecting strip joining the said adjacent trough sections together through their flanges.

7. A sheet metal column structure comprising flanged trough sections facing inwardly of the column, longitudinal connecting strips joining adjacent trough sections together through their flanges at points of juncture outside the column, and a channel section member disposed between the flanges of said trough sections and secured thereto.

8. A sheet metal column structure comprising flanged trough sections facing inwardly of the column and spaced apart, a pair of bracing members one secured within each of two adjacent trough sections and joined to each other in the space between the said two adjacent trough sections, a joining member secured to the joined bracing members and to a pair of adjacent flanges of said adjacent trough sections, and a cover strip joining the said adjacent trough sections together.

9. A sheet metal column structure comprising opposed trough sections facing inwardly of the column and spaced apart, and a pair of bracing members, one joined in sub-assembly to the inner face of each of said trough sections, and in final assembly overlapping and joined to each other in the space between the two opposed trough sections.

10. A sheet metal column structure comprising trough sections facing inwardly of the column and spaced apart, and a pair of bracing members one joined to each of two trough sections and joined to each other in the space between the two adjacent trough sections, together with a joining member secured to the joined bracing members in the said space between the two adjacent trough sections and to two adjacent side edges of said two adjacent trough sections.

11. A sheet metal column structure comprising trough sections facing inwardly of the column and spaced in their margins and transverse bulkheads secured within the column directly to the inner faces of the trough sections and extending between said trough sections, and longitudinal strips closing the spaces between the margins of said trough sections.

12. A sheet metal column structure comprising overlapping layers of staves, the staves of each layer being spaced apart laterally with the spaces between the staves of one layer overlapped by the staves of an adjacent layer, and stiffening angle strips having freely projecting arms and secured along the staves of one layer over an area of overlap with an adjacent layer by spot welds through both layers, said freely projecting arms serving as means for joining the column wall to a bulk head structure.

13. A tapered sheet metal mast formed of overlapping layers of tapered staves, one layer of staves being vertically arranged in successive annular tiers, the staves decreasing in number and increasing in angular width in successive tiers toward the top of the mast.

14. A tapered sheet metal mast comprising inner and outer layers of staves, one layer of staves being vertically arranged in two annular tiers one above the other, the staves of the upper tier being thinner than those of the lower tier, filler members secured to the thinner staves near the point of junction with the lower staves, and splicing battens spot welded through all of said staves and said filler members.

15. A tapered sheet metal mast formed of tapered staves vertically arranged in successive annular tiers one above the other, the staves decreasing in number and increasing in angular width in successive tiers toward the top of the mast.

16. A tapered sheet metal mast comprising overlapping layers of staves, each layer of staves being vertically arranged in annular tiers one above the other, the tiers of one layer being in staggered relation longitudinally of the mast with respect to those of the other layer, the staves of the topmost tier of one layer being thinner than those of the next lower tier of that layer, and the topmost tier of the other layer extending upwardly beyond the topmost tier of the said one layer to form a wall of one layer thickness.

17. A sheet metal column structure of polygonal cross sectional contour formed of overlapped layers of staves of angular section overlapping at the angles and breaking joint between the angles, the joints of different layers being staggered and longitudinal stiffening ribs each secured through one arm to the inside surfaces of the inside layer of staves, and having another arm freely projecting, each of said ribs spot welded through the said overlapping portions between adjacent staggered joints of different layers, and a bulk head structure secured to said freely projecting arms of the stiffening ribs.

18. A sheet metal column structure comprising overlapping layers of staves, the staves of each layer being spaced apart laterally with the spaces between the staves of one layer overlapped by the staves of an adjacent layer, stiffening angle strips having freely extending arms and arms overlapping and secured along the staves of one layer over an area of overlap with an adjacent layer, and transverse bulkheads secured within the column structure both to the area of overlap between the stave layers and to the freely extending arms of the stiffening angle strips.

EARL J. W. RAGSDALE.
CHARLES B. CONWELL.